US010311579B2

(12) United States Patent
Yun et al.

(10) Patent No.: US 10,311,579 B2
(45) Date of Patent: Jun. 4, 2019

(54) APPARATUS AND METHOD FOR DETECTING FOREGROUND IN IMAGE

(71) Applicants: Samsung Electronics Co., Ltd., Suwon-si (KR); Seoul National University R&DB Foundation, Seoul (KR)

(72) Inventors: Ki Min Yun, Changwon-si (KR); Jin Young Choi, Seoul (KR); Jong In Lim, Seoul (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 164 days.

(21) Appl. No.: 15/405,735

(22) Filed: Jan. 13, 2017

(65) Prior Publication Data

US 2017/0213100 A1 Jul. 27, 2017

(30) Foreign Application Priority Data

Jan. 22, 2016 (KR) ........................ 10-2016-0008335

(51) Int. Cl.
*G06T 7/174* (2017.01)
*G06T 7/194* (2017.01)
(Continued)

(52) U.S. Cl.
CPC ................ *G06T 7/194* (2017.01); *G06K 9/34* (2013.01); *G06K 9/38* (2013.01); *G06T 7/11* (2017.01);
(Continued)

(58) Field of Classification Search
CPC .......... G06K 9/34; G06K 9/38; G06K 9/4606; G06K 9/72; G06T 7/11; G06T 7/174;
(Continued)

(56) References Cited

U.S. PATENT DOCUMENTS 5,862,508 A * 1/1999 Nagaya ................. F41G 7/2226 345/473
8,125,512 B2 2/2012 Fahn et al.
(Continued)

FOREIGN PATENT DOCUMENTS

KR 10-2009-0062049 A 6/2009
KR 10-1271092 B1 6/2013
(Continued)

OTHER PUBLICATIONS

Monnet et al. ("Background modeling and subtraction of dynamic scenes." Proceedings 9th IEEE International Conference on Computer Vision, Oct. 13-16, 2003) (Year: 2003).*
(Continued)

*Primary Examiner* — Yubin Hung
(74) *Attorney, Agent, or Firm* — NSIP Law

(57) ABSTRACT

An apparatus and method for detecting a foreground in an image is provided, and the foreground detecting apparatus includes a context information estimator configured to estimate context information on a scene from an image frame of the image, a background model constructor configured to construct a background model of the image frame using the estimated context information, and a foreground detector configured to detect a foreground from the image frame based on the constructed background model.

22 Claims, 24 Drawing Sheets

START
711 ESTIMATE BACKGROUND MOTION
712 ESTIMATE FOREGROUND SPEED BASED ON BACKGROUND MOTION
713 CONTEXT VARIABLE = COUNTING VARIABLE * FOREGROUND SPEED
714 ESTIMATE ILLUMINATION CHANGE BASED ON BACKGROUND MODEL
721 GENERATE BACKGROUND MODEL OF CURRENT FRAME
722 CONTEXT VARIABLE ≤ BLOCK SIZE
YES
NO
723 ADDITIONALLY CORRECT BACKGROUND
724 UPDATE BACKGROUND MODEL BY REFLECTING ILLUMINATION CHANGE AND ADDITIONAL INFORMATION ON BACKGROUND MODEL
726 UPDATE BACKGROUND MODEL BY REFLECTING ILLUMINATION CHANGE THEREON
725 RESET COUNTING VARIABLE TO 1
727 INCREASE COUNTING VARIABLE BY 1
731 GENERATE FOREGROUND PROBABILITY MAP
732 EXTRACT FOREGROUND
END

(51) Int. Cl.
*G06T 7/215* (2017.01)
*G06K 9/34* (2006.01)
*G06K 9/38* (2006.01)
*G06T 7/11* (2017.01)

(52) U.S. Cl.
CPC .............. *G06T 7/174* (2017.01); *G06T 7/215* (2017.01); *G06T 2207/10016* (2013.01); *G06T 2207/20081* (2013.01)

(58) Field of Classification Search
CPC ........... G06T 7/194; G06T 2207/10016; G06T 2207/20081; G06T 7/215
See application file for complete search history.

(56) References Cited

U.S. PATENT DOCUMENTS

| | | | | |
|---|---|---|---|---|
| 8,159,536 | B2 | 4/2012 | Wang et al. | |
| 8,224,088 | B2 | 7/2012 | Itoh et al. | |
| 8,933,797 | B2 | 1/2015 | Deigmoller et al. | |
| 9,292,743 | B1 * | 3/2016 | Maali | G06K 9/00771 |
| 2003/0081836 | A1 * | 5/2003 | Averbuch | G06K 9/38 382/199 |
| 2004/0218830 | A1 * | 11/2004 | Kang | G06T 5/50 382/274 |
| 2007/0282908 | A1 * | 12/2007 | Van der Meulen | G06F 17/30997 |
| 2008/0114633 | A1 * | 5/2008 | Wolf | G06F 17/30793 705/7.29 |
| 2008/0292142 | A1 | 11/2008 | Woo et al. | |
| 2009/0062049 | A1 | 3/2009 | Cranston et al. | |
| 2009/0154565 | A1 | 6/2009 | Jeong et al. | |
| 2010/0208986 | A1 * | 8/2010 | Cobb | G06K 9/00771 382/165 |
| 2011/0064315 | A1 * | 3/2011 | Thomas | G06K 9/00771 382/199 |
| 2013/0044951 | A1 | 2/2013 | Cherng et al. | |
| 2013/0216144 | A1 * | 8/2013 | Robinson | G06T 7/2006 382/233 |
| 2013/0242095 | A1 * | 9/2013 | Lipton | G06K 9/00771 348/143 |
| 2013/0336577 | A1 * | 12/2013 | Lu | G06K 9/00 382/154 |
| 2015/0139484 | A1 * | 5/2015 | Wu | G06K 9/00624 382/103 |
| 2015/0178318 | A1 | 6/2015 | Lee et al. | |
| 2015/0310297 | A1 * | 10/2015 | Li | G06K 9/00785 382/199 |
| 2015/0324656 | A1 | 11/2015 | Marks et al. | |
| 2016/0110625 | A1 * | 4/2016 | Vaughan | G06T 7/11 382/103 |

FOREIGN PATENT DOCUMENTS

| | | |
|---|---|---|
| KR | 10-1409810 B1 | 6/2014 |
| KR | 10-1438451 B1 | 9/2014 |

OTHER PUBLICATIONS

Schultz et al. ("Subpixel Motion Estimation for Multiframe Resolution Enhancement," Proc. SPIE 3024, Jan. 10, 1997) (Year: 1997).*

Raminez-Alonso et al. ("Segmentation of dynamic objects in video sequences fusing the strengths of a background subtraction model, optical flow and matting algorithms," Southwest Symposium on Image Analysis and Interpretation, Apr. 6-8, 2014) (Year: 2014).*

C. Stauffer, et al., "Adaptive background mixture models for real-time tracking," in Computer Vision and Pattern Recognition (CVPR), 1999. (7 pages in English).

A. Mittal, et al., "Scene Modeling for Wide Area Surveillance and Image Synthesis." in Computer Vision and Pattern Recognition (CVPR). Proceedings. IEEE Conference on. vol. 2, 2000, pp. 2160-2167. (8 pages in English).

K. S. Bhat, et al., "Motion Detection and Segmentation using Image Mosaics." in IEEE International Conference on Multimedia and Expo, 2000, pp. 1577-1580. (4 pages in English).

Y. Sheikh, et al., "Bayesian Object Detection in Dynamic Scenes," in Computer Vision and Pattern Recognition (CVPR), 2005, pp. 74-79. (6 pages in English).

Dar-Shyang Lee, "Effective Gaussian Mixture Learning for Video Background Subtraction," IEEE Transactions on Pattern Analysis and Machine Intelligence, vol. 27, No. 5, pp. 827-832, May 2005. (6 pages in English).

Rita Cucchiara, et al., "Advanced Video Surveillance with Pan Tilt Zoom Cameras," in Proc. of the 6th IEEE International Workshop on Visual Surveillance on ECCV, 2006. (8 pages in English).

L. Robinault, et al., "Real Time Foreground Object Detection using PTZ Camera," in International Conference on Computer Vision Theory and Applications (VISAPP), 2009, pp. 609-614. (6 pages in English).

C. Guillot, et al., "Background subtraction adapted to PTZ cameras by keypoint density estimation,"in British Machine Vision Conference (BMVC), 2010, pp. 34.1-34.10. (10 pages in English).

T. Ko, et al., "Warping Background Subtraction," In Computer Vision and Pattern Recognition (CVPR), 2010, pp. 1331-1338. (8 pages in English).

O. Barnich et al., "ViBe: A Universal Background Subtraction Algorithm for Video Sequences." IEEE Transactions on Image Processing, vol. 20, No. 6, pp. 1709-1724, Jun. 2011. (17 pages in English).

S. W. Kim, et al., "Detection of Moving Objects with a Moving Camera using non-panoramic Background model," Machine Vision and Applications, Oct. 6, 2012. (14 pages in English).

K. M. Yi, et al., "Detection of Moving Objects with Non-stationary Cameras in 5.8ms: Bringing Motion Detection to Your Mobile Device," in Computer Vision and Pattern Recognition Workshops (CVPRW), 2013. (8 pages in English).

J. Kim, et al., "Fast Moving Object Detection with non-stationary Background," Multimedia tools and applications, vol. 67, No. 1, 2012. (25 pages in English).

P. St-Charles, et al., "SuBSENSE: A Universal Change Detection Method With Local Adaptive Sensitivity," Image Processing, IEEE Transactions on, vol. 24, No. 1, pp. 359-373, Jan. 1, 2015. (15 pages in English).

* cited by examiner

Frame 400 Frame 700 Frame 820

Frame 233 Frame 530 Frame 600

FIG. 9C

Frame 233 Frame 530 Frame 600

APPARATUS AND METHOD FOR DETECTING FOREGROUND IN IMAGE

CROSS-REFERENCE TO RELATED APPLICATION(S)

This application claims the benefit under 35 USC § 119(a) of Korean Patent Application No. 10-2016-0008335, filed on Jan. 22, 2016, in the Korean Intellectual Property Office, the entire disclosure of which is incorporated herein by reference for all purposes.

BACKGROUND

1. Field

The following description relates to an image processing technology, and particularly, a technology for detecting a foreground in an image input from a moving camera.

2. Description of Related Art

A moving object in an image is detected using different methods. In the case of a static camera, background subtraction is used. In background subtraction, it is assumed that similar colors enter the same location on a background region over time, a background is learned and the learned background is subtracted from an input image to find a moving object, i.e., a foreground region. In the case of a moving camera, a background also has motion due to camera movement, thus, a method of performing background subtraction after generating a large panorama image using image stitching, and a method of performing background subtraction after compensating for background motion occurring due to camera movement in a learned background model are proposed. However, a panorama-image based method has difficulty determining a stitching location and may be limited by the amount of memory required. In addition, a compensation-based method has difficulty in estimating background motion, which leads to difficulty in detecting a foreground when a background speed is significantly high.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

In one general aspect, there is provided an apparatus for detecting a foreground in an image, the apparatus including a processor configured to estimate context information on a scene from an image frame of the image, construct a background model of the image frame using the estimated context information, and detect a foreground from the image frame based on the constructed background model.

The processor may include a context information estimator configured to estimate the context information on the scene from the image frame of the image, a background model constructor configured to construct the background model of the image frame using the estimated context information, and a foreground detector configured to detect the foreground from the image frame based on the constructed background model.

The context information may include any one or any combination of background motion, a foreground speed, and an illumination change.

The context information estimator may include a background motion estimator configured to calculate a speed using an optical flow of the image frame and a previous image frame, and to generate a projective transform matrix that represents the background motion using the speed, a foreground speed estimator configured to estimate a foreground speed by correcting the speed based on the generated projective transform matrix, and an illumination change estimator configured to estimate the illumination change based on a difference between a mean of brightness intensities of the image frame and a mean of brightness intensities of the background model.

The background model constructor may include a background model generator configured to generate the background model of the image frame using a background model of a previous image frame and the background motion.

The background model generator may be configured to determine locations on the previous image frame based on a location of the previous image frame which corresponds to a first location of the image frame, and to generate a background model of the first location by performing weighted summation on background models of the determined locations.

The background model generator may be configured to correct a variance of the generated background model, in response to a value of a context variable based on the foreground speed being equal to or larger than a block size.

The background model generator may be configured to correct a variance of the background model of the first location by reflecting differences between a mean of the background model of the first location and means of the background models at the locations.

The background model constructor may include a background model updater configured to update the generated background model based on the illumination change.

The background model updater may be configured to update a mean of the generated background model by reflecting the illumination change, in response to value of a context variable being smaller than a block size, and to update the mean and a variance of the generated background model by reflecting the illumination change and additional information, in response to the value of the context variable being equal to or larger than the block size.

The additional information may include any one or any combination of a mean of block-specific brightness intensities and information on a difference between a mean of the generated background model and the image frame.

The background model updater may calculate a value of a time-variant variable in units of blocks starting from an initial image frame input from the camera to the image frame, and adjusts an update intensity of the generated background model using the value of the time-variant variable.

The foreground detector may include a foreground probability map generator configured to generate a foreground probability map by calculating a foreground probability for each pixel of the image frame based on the constructed background model, and a foreground extractor configured to extract the foreground from the image frame using the generated foreground probability map.

The foreground extractor may be configured to classify the each pixel of the image frame into at least one of the foreground, a candidate, and a background based on a comparison of the foreground probability of the each pixel of the image frame with a threshold value, and to categorize pixels classified into the candidate into the foreground or the background based on applying watershed segmentation to the pixels classified into the candidate.

The apparatus may include a memory configured to store instructions, and wherein the processor may be configured to execute the instructions to estimate context information on a scene from an image frame of the image, to construct a background model of the image frame using the estimated context information, and to detect a foreground from the image frame based on the constructed background model.

The previous image frame may comprise the immediately previous image frame.

In another general aspect, there is provided a method of detecting a foreground in an image, the method including estimating context information on a scene from an image frame of the input image, constructing a background model of the image frame using the estimated context information, and detecting a foreground from the image frame based on the constructed background model.

The context information may include any one or any combination of background motion, a foreground speed, and an illumination change.

The constructing of the background model may include generating the background model of the image frame using a background model of a previous image frame based on information on the background motion.

The constructing of the background model may include correcting a variance of the generated background model in response to a value of a context variable based on the foreground speed being equal to or larger than a block size.

The constructing of the background model may include updating the generated background model based on the illumination change.

The updating of the background model may include updating a mean of the generated background model by reflecting the illumination change, in response to a value of a context variable being smaller than a block size, and updating a mean and a variance of the generated background model by reflecting the illumination change and additional information, in response to the value of the context variable being equal to or larger than the block size.

The detecting of a foreground may include generating a foreground probability map by calculating a foreground probability for each pixel of the image frame based on the constructed background model, and extracting the foreground from the image frame using the generated foreground probability map.

In another general aspect, there is provided a digital device including an antenna, a cellular radio configured to transmit and receive data via the antenna according to a cellular communications standard, a touch-sensitive display, a camera configured to capture an image, a memory configured to store instructions, and wherein the processor is further configured to execute the instructions to receive the image from the camera, estimate context information on a scene from an image frame of the image, construct a background model of the image frame by amending a background model of a previous frame based on the estimated context information, and detect a foreground from the image frame based on the constructed background model.

Other features and aspects will be apparent from the following detailed description, the drawings, and the claims.

BRIEF DESCRIPTION OF THE DRAWINGS

FIGS. 3A-3C are diagrams illustrating examples of estimation of a foreground speed.

FIGS. 5A-5D are diagrams illustrating examples of detection of a foreground from an input image.

FIGS. 8A-8E are a diagrams illustrating examples of detection of a foreground through recognition of a foreground speed.

FIGS. 9A-9E are diagrams illustrating examples of detection of a foreground through recognition of an illumination change.

Figure 1:
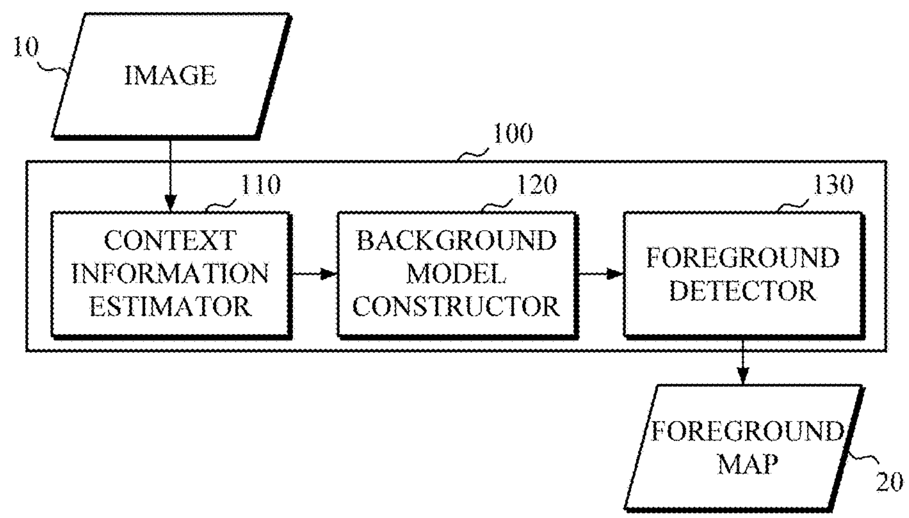
FIG. 1 is a diagram illustrating an example of a foreground detecting apparatus.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

FIG. 1 is a diagram illustrating an example of a foreground detecting apparatus.

A foreground detecting apparatus 100 detects a foreground by processing an input image, and the following description will be made in relation to an example in which the foreground detecting apparatus 100 detects a foreground 20 from an image input 10, which is input from a moving camera. However, the following disclosure is not limited thereto, and may be applied to other examples, such as an example where a foreground is detected from an image acquired from a static camera. In this case, the image input to the foreground detecting apparatus 100 is input in units of frames, and for the convenience sake of description, an image of a frame input at the current time point is referred to as a current frame, and an image of a frame input at an previous time point is referred to as a previous frame. In an example, the previous frame may be a frame input at an immediately previous time point and is referred to as an immediately previous frame.

Referring to FIG. 1, the foreground detecting apparatus 100 includes a context information estimator 110, a background model constructor 120, and a foreground detector 130.

When a current frame is input from a camera, the context information estimator 110 estimates context information on a scene of the current frame. In an example, the context information may include background motion occurring due to a movement of the camera, a foreground speed representing the speed of a moving object, and an illumination change representing an overall change in brightness of the scene. However, the context information is not limited thereto, and various other types of context information, such as, for example, time that the current frame is captured, location of the current frame, are considered to be well within the scope of the present disclosure.

For example, assuming that a background takes up a higher proportion than a foreground in an image, the context information estimator 110 may obtain motion information at each location in the input current frame, remove an outlier, and estimate background motion. In another example, the context information estimator 110 may determine a location that does not match the background motion estimated at each location of the current frame as a foreground, measure the speed of the location determined as the foreground, and estimate a foreground speed based on a relative speed obtained by subtracting a background speed from the measured speed. In addition, a viewing area of a moving camera may change significantly, causing an abrupt change in the overall brightness of an image. In order to reflect such a change in the brightness, the context information estimator 110 may estimate an illumination change.

The background model constructor 120 may construct a background model for the current frame by reflecting the estimated context information, for example, the background motion, the foreground speed, and the illumination change information. In an example, the background model includes a mean and a variance for a background, and is constructed in units of blocks having a size that includes a plurality of pixels, rather than being constructed in units of pixels. In an example, the units of blocks has a predetermined size.

The background model constructor 120 may construct a background model for a current frame by correcting a background model of a previous frame based on the estimated context information, which will be described in further detail later with reference to FIG. 2A. In an example, the previous frame is an immediately previous frame. For example, since a background does not move in a block unit, the background model constructor 120 may generate a background model for the current frame based on a background model of adjacent blocks or adjacent pixels of the immediately previous frame in consideration of the estimated background motion information. In an example, when a foreground speed is high, image matching may be determined to be poor due to edges, and in order to reduce a false alarm, an additional correction may be performed to increase variance of the generated background model.

After the background model for the current frame is generated as described above, the background model constructor 120 may update the background model by reflecting the estimated illumination change. In an example, in order to prevent contamination of the background by a foreground, the background model may be updated differently according to the foreground speed. For example, the background model constructor 120 may define a context variable based on a foreground speed, compare the context variable with a block size, and when a value of the context variable is smaller than the block size, update the mean by reflecting the illumination change, and not update the variance. In another example, when a value of the context variable is equal to or larger than the block size, the mean and the variance may be updated by reflecting the illumination change and/or additional information.

The foreground detector 130 may detect a foreground from the current frame using the background model constructed by the background model constructor 120, and output a foreground map 20. In an example, the foreground detector 130 does not independently determine the foreground on the basis of a pixel. The foreground detector 130 obtains a foreground probability map using the constructed background model and performs propagation from a region having a high probability to nearby foreground candidate areas indicating a foreground.

Figure 2A:
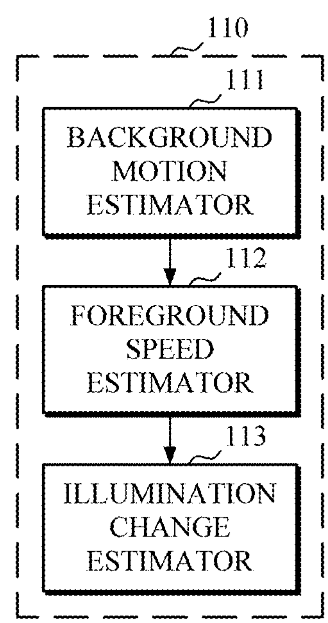
FIGS. 2A to 2C are diagrams illustrating examples of parts of a foreground detecting apparatus 100 shown in FIG. 1.
Figure 2B:
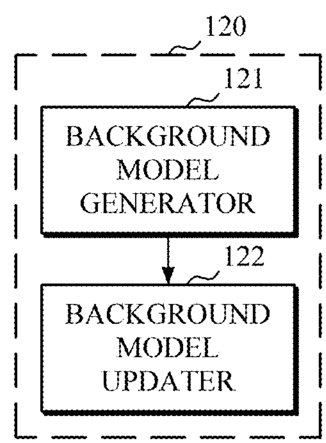
Figure 2C:
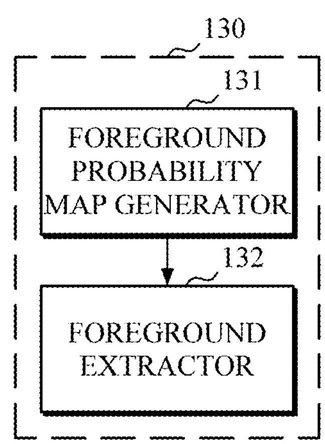

FIGS. 2A to 2C are diagram illustrating parts 110, 120 and 130 of the foreground detecting apparatus 100 of FIG. 1. The foreground detecting apparatus 100 will be described in detail with reference to FIGS. 2A to 2C.

FIG. 2A shows an example of the context information estimator 110 shown in FIG. 1. In an example, the context information estimator 110 includes a background motion estimator 111, which estimates background motion, a foreground speed estimator 112, which measures a foreground speed, and an illumination change estimator 113, which estimates an illumination change.

The background motion estimator 111 may estimate background motion using a current frame and a previous frame. Generally, an image captured by a moving camera has motion even in a background, so the background motion needs be considered to precisely detect a foreground. In an example, assuming that a background takes up a higher proportion than a foreground in an image, the background motion estimator 111, obtains a speed at each location, removes an outlier, and estimates the background motion by expressing a projective model that covers as wide an area as possible.

For example, the background motion estimator 111 may generate a projective transform matrix $H_{t:t-1}$ at represents background motion using Equation 1 below, and use the generated projective transform matrix $H_{t:t-1}$ as background motion information.

Equation 1

$$I^{(t)}(x_i+u_i,y_i+v_i)=I^{(t-1)}(x_i,y_i) \quad \text{(a)}$$

$$X_i^{(t-1)}=(x_i,y_i,1)^T, X_i^{(t)}=(x_i+u_i,y_i+v_i,1)^T \quad \text{(b)}$$

$$[X_1^{(t)}, X_2^{(t)}, \ldots]=H_{t:t-1}[X_1^{(t-1)},X_2^{(t-1)}, \ldots] \quad \text{(c)}$$

Here, $X_i^{(t-1)}$ and $X_i^{(t)}$ represent coordinates of an $i^{th}$ block of an immediately previous frame and coordinates of a current frame mapping the $i^{th}$ block, respectively.

Referring to Equation 1, when a current frame is input at a time point t, the background motion estimator 111 converts the current frame into gray scale to obtain a converted current frame $I^{(t)}$, and divides an immediately previous frame $I^{(t-1)}$ input at an immediately previous time point t-1 into a plurality of blocks. Then, the background motion estimator 111 may find a region of the current frame $I^{(t)}$ that matches a center location $(x_i, y_i)$ of the $i^{th}$ block of the immediately previous frame. In this case, based on an assumption in optical flow that the same brightness intensity is kept at a matching location, the background motion estimator 111 may obtain a speed of the $i^{th}$ block $(u_i, v_i)$ satisfying Equation 1(a) above. The background motion estimator 111 may represent a relationship between the immediately previous frame and the current frame using the speed of the block as shown in Equation 1(b) above. The background motion estimator 111 may obtain the projective transform matrix $H_{t:t-1}$ satisfying Equation 1(c) above, using the relationship. In an example, in order to effectively represent the motion of the entire scene, outliers may be removed.

When the projective transform matrix $H_{t:t-1}$ is generated, the foreground speed estimator 112 may obtain a foreground speed associated with foreground motion using the projective transform matrix $H_{t:t-1}$. For example, motion of the block that does not satisfy $X_i^{(t)}=H_{t:1-1}X_i^{(t-1)}$ may be determined to be the foreground motion, and accordingly, Equation 2(a) below, a corrected speed $(\hat{u}_i, \hat{v}_i)$ may be obtained. In an example, a block in which the background is positioned has a corrected speed of 0 so only a speed of a region in which a foreground is positioned remains to obtain the speed of a foreground portion. By considering a possibility of noise existing when a block speed calculated by Equation 1(a) is not precise, the foreground speed estimator 112 may estimate an average foreground speed using the foreground speed at each location spanning foreground pixels of an immediately previous frame as shown of Equation 2(b).

Equation 2

$$\text{(a) } (\hat{u}_i, \hat{v}_i, 1) = X_i^{(t)} - H_{t:t-1}X_i^{(t-1)}$$

$$\text{(b) } s^{(t)} = \frac{1}{P}\sum_{p \in FG^{(t)}} \sqrt{\hat{u}_p^2 + \hat{v}_p^2},$$

Here, $FG^{(t)}$ represents a foreground area of an immediately previous frame, p represents the location of a pixel in the foreground area, and P represents the number of pixels in the foreground area.

Figure 3A:
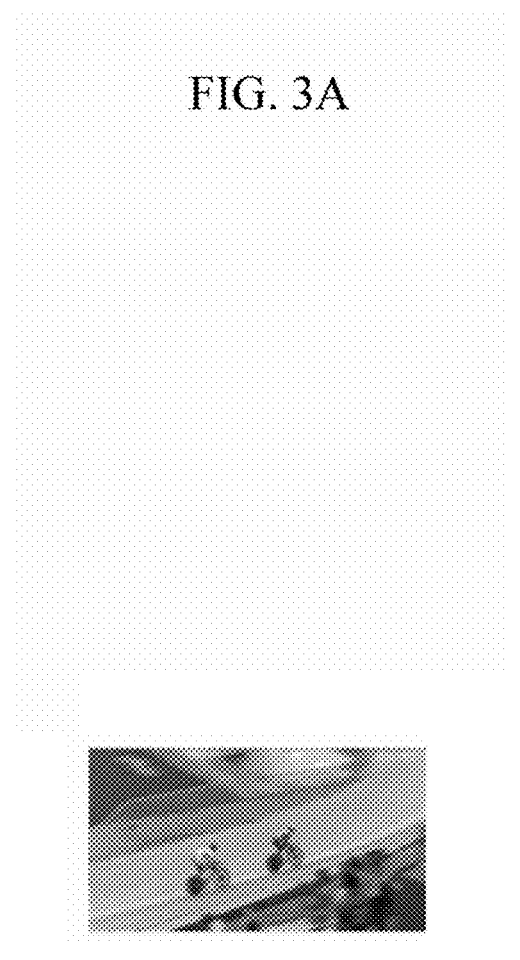
Figure 3B:
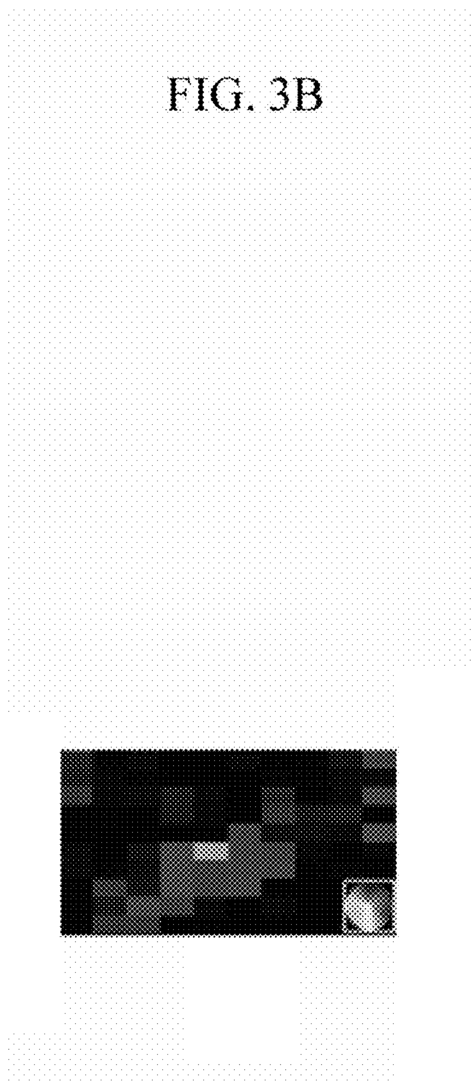
Figure 3C:
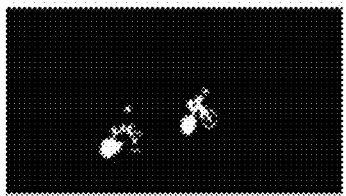

FIGS. 3A-3C are diagrams illustrating examples of estimation of a foreground speed. FIG. 3A shows an input image, and using Equation 2, background motion is corrected is the input image and then a corrected speed of a foreground portion, i.e., a speed of a bicycle moving rightward, is obtained as in FIG. 3B. FIG. 3C shows a foreground extracted using the speed of the bicycle obtained in FIG. 3B.

Referring again to FIG. 2A, the illumination change estimator 113 may measure the overall brightness change of a scene when a current frame is input. For example, the illumination change estimator 113 may estimate an illumination change using a difference between a mean of brightness intensities of a current frame $I_j^t$ and a mean of means $\tilde{\mu}_i^{(t)}$ of background models. Although the background may be implemented using a background model of the current frame, the present disclosure is not limited thereto. In an example, background model of an immediately previous frame may be used.

Equation 3

$$b^{(t)} = \frac{1}{N}\sum_{j=1}^{N} I_j^{(t)} - \frac{1}{M}\sum_{i=1}^{M}\tilde{\mu}_i^{(t)}$$

FIG. 2B is a diagram illustrating an example of the background model constructor 120 of FIG. 1. In an example, the background model constructor 120 includes a background model generator 121 and a background model updater 122.

The background model generator 121 may generate a background model for a current image frame using the estimated context information. The background model generator 121 may generate a background model of a current frame by correcting a mean and a variance of a background model of an immediately previous frame to match a location of the current frame using background motion information. The background motion information represents a position relationship in mapping between the immediately previous frame and the current frame, from among the estimated context information.

For example, the background model generator 121 may generate a background model of a current frame using Equation 4 below. The background model generator 121 may map the location of the current frame to the immediately previous frame using an inverse matrix of the projective transform matrix $H_{t:t-1}$ that represents the background motion as in Equation 4(a). A first location of the current frame may be mapped to a second location that is not a central position of a block of the immediately previous frame. In an example, the background model generator 121 may determine a plurality of locations around the second location, and generate a background model for the first location of the current frame using background models of the plurality of locations.

Figure 4:
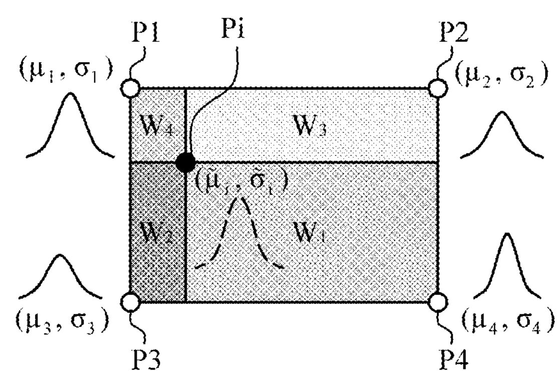
FIG. 4 is an example of a diagram illustrating generation of a background model for an input image.

FIG. 4 is a diagram illustrating an example of generation of a background model with respect to an input image. In an example, the background model generator 121 uses a bilinear interpolation method as shown in FIG. 4. Assuming that coordinates of the second location corresponding to the first location are (x,y), the background model generator 121 may determine locations P1, P2, P3, and P4 that satisfy a set of integers $\{(\lfloor x\rfloor, \lfloor y\rfloor), (\lfloor x\rfloor, \lceil y\rceil), (\lceil x\rceil, \lfloor y\rfloor), (\lceil x\rceil, \lceil y\rceil)\}$. For example, when the first location has coordinates (10,10) and the mapped second location has coordinates (5.3,4.7), the determined plurality of integer locations may be {(5,4), (5,5), (6,4), (6,5)}. Using background models $(\mu_1, \sigma_1)$, $(\mu_2, \sigma_2)$, $(\mu_3, \sigma_3)$, and $(\mu_4, \sigma_4)$ of the determined locations P1, P2, P3, and P4, a background model $(\tilde{\mu}_i, \tilde{\sigma}_i)$ of the second location is generated.

In other words, using (b) and (c) of Equation 4, a mean $\mu_k^{(t-1)}$ and a variance $\sigma_k^{(t-1)}$ of a background model at each location of the immediately previous frame is subject to weighted summation, thereby generating a background model $(\tilde{\mu}_i^{(t-1)}, \tilde{\sigma}_i^{(t-1)})$ of the second location of the immediately previous frame. The background model of the second location may be constructed as a background model for the first location of the current frame by the background model updater 122 reflecting an illumination change.

Equation 4

$$\text{(a) } X_i^{(t-1)} = H_{t:t-1}^{-1}X_i^{(t)}$$

$$\text{(b) } \tilde{\mu}_i^{(t-1)} = \sum_{k \in R_i} w_k\mu_k^{(t-1)}$$

$$\text{(c) } \tilde{\sigma}_i^{(t-1)} = \sum_{k \in R_i} w_k\sigma_k^{(t-1)}$$

In this case, a weight value may be determined by an area formed by a second location Ri and each integer location P1, P2, P3, and P4 as illustrated in FIG. 4, and may be calculated according to Equation 5 below.

Equation 5

$$w_1 = \frac{(\lceil x\rceil - x)(\lceil y\rceil - y)}{(\lceil x\rceil - \lfloor x\rfloor)(\lceil y\rceil - \lfloor y\rfloor)}$$

-continued $$w_2 = \frac{(x - \lfloor x \rfloor)(\lceil y \rceil - y)}{(\lceil x \rceil - \lfloor x \rfloor)(\lceil y \rceil - \lfloor y \rfloor)}$$

$$w_3 = \frac{(\lceil x \rceil - x)(y - \lfloor y \rfloor)}{(\lceil x \rceil - \lfloor x \rfloor)(\lceil y \rceil - \lfloor y \rfloor)}$$

$$w_4 = \frac{(x - \lfloor x \rfloor)(y - \lfloor y \rfloor)}{(\lceil x \rceil - \lfloor x \rfloor)(\lceil y \rceil - \lfloor y \rfloor)}$$

After the background model of the second location is generated, the background model generator 121 may additionally correct the variance by reflecting a foreground speed on the variance. For example, the background model generator 121 defines a counting variable and a context variable, initially sets the counting variable $c^{(t)}$ to 1, and multiplies the counting variable $c^{(t)}$ by a foreground speed $s^{(t)}$ such that a result of the multiplication is set as a value of a context variable value $c^{(t)} \cdot s^{(t)}$. When the context variable has a value smaller than a block size B as in Equation 6 below, the counting variable is increased by 1, and otherwise, the counting variable is reset to 1.

$$c^{(t+1)} = \begin{cases} c^{(t)} + 1, & \text{if } c^{(t)} \cdot s^{(t)} < B \\ 1 & \end{cases} \qquad \text{Equation 6}$$

The background model generator 121 maintains the variance when the foreground speed is slow, i.e., the context variable value is smaller than the block size as shown in Equation 7 below. Otherwise, squares of differences between a mean of the background model generated for the second location and means of the background models of the respective locations are subject to weighted summation, and the result is added to the variance of the background model generated for the second location, thereby additionally correcting the variance by reflecting the foreground speed.

$$\tilde{\sigma}_i^{(t-1)} = \begin{cases} \tilde{\sigma}_i^{(t-1)}, \text{ if } c^{(t)} \cdot s^{(t)} < B \\ \tilde{\sigma}_i^{(t-1)} + \sum_{k \in R_i} w_k (\tilde{\mu}_i^{(t-1)} - \mu_k^{(t-1)})^2 \end{cases} \qquad \text{Equation 7}$$

The background model updater 122 may update the generated background model by reflecting the foreground speed $s^{(t)}$ and the illumination change $b^{(t)}$. For example, the background model updater 122 may update the mean and the variance of the background model differently according to the foreground speed.

$$\mu_i^{(t)} = \begin{cases} \tilde{\mu}_i^{(t-1)} + b^{(t)} & \text{if } c^{(t)} \cdot s^{(t)} < B \\ \frac{\alpha_i^{(t-1)}}{\alpha_i^{(t-1)} + 1}(\tilde{\mu}_i^{(t-1)} + b^{(t)}) + \frac{1}{\alpha_i^{(t-1)} + 1} M_i^{(t)} & \end{cases} \qquad \text{Equation 8}$$

$$\sigma_i^{(t)} = \begin{cases} \sigma_i^{(t-1)} & \text{if } c^{(t)} \cdot s^{(t)} < B \\ \frac{\alpha_i^{(t-1)}}{\alpha_i^{(t-1)} + 1}\sigma_i^{(t-1)} + \frac{1}{\alpha_i^{(t-1)} + 1} V_i^{(t)} & \end{cases}$$

In an example, the background model updater 122 compares the context variable value defined as above with a block size, and if the context variable value is smaller than the block size, update the mean by reflecting an illumination change and maintains the variance. In another example, if the context variable value is equal to or larger than the block size, the background model updater 122 updates the mean and the variance by reflecting additional information thereon. In this case, the background model updater 122 may update the mean by reflecting additional information, i.e., a value $M_i^{(t)}$ defined as a block brightness intensity average, together with the illumination change, and update the variance by reflecting additional information, i.e., a maximum value $V_i^{(t)}$ of a square of a difference between the mean of the background model and an input image, according to Equation 9 below.

$$M_i^{(t)} = \frac{1}{|B_i|} \sum_{j \in B_i} I_j^{(t)} \qquad \text{Equation 9}$$

$$V_i^{(t)} = \max_{j \in B_i} (\mu_i^{(t)} - I_j^{(t)})^2$$

In an example, the background model updater 122 may define a time-variant variable $\alpha_i^{(t)}$ that represents a frequency at which the block appears on scenes from a first frame to the current frame due to camera motion as shown in Equation 10. The background model updater 122 may adjust an update intensity of the mean and the variance using the time-variant variable. In an example, the time-variant variable has a value of 1 for a block which appears for the first time on the scene. As such, using the time-variant variable to adjust the update intensity causes an area that appears for the first time on the scene to be updated at a significantly high speed, and an area that has appeared for a long time to be updated at a low speed. In an example, when the time-variant variable is a predetermined value or above, an update may not be performed. In order to prevent such a constraint, the time-variant variable may have a maximum value $\alpha_{max}$.

$$\alpha_i^{(t)} = \tilde{\alpha}_i^{(t-1)} + 1 \qquad \text{Equation 10}$$

FIG. 2C is a diagram illustrating an example of the foreground detector 130, which includes a foreground probability map generator 131 and a foreground extractor 132.

The foreground probability map generator 131 may generate a foreground probability map representing a probability that an input pixel corresponds to a foreground using the background model ($\mu^{(t)}$, $\sigma^{(t)}$) for the current frame. For example, the foreground probability map generator 131 may generate a foreground probability map $f_{FG}(j)$ representing a probability that a $j^{th}$ pixel in the $i^{th}$ block corresponds to the foreground through Equation 11.

$$f_{FG}(j) = \frac{(I_j^{(t)} - \mu_i^{(t)})^2}{\sigma_i^{(t)}} \qquad \text{Equation 11}$$

The foreground extractor 132 may extract the foreground from the current image frame using the generated foreground probability map. For example, the foreground extractor 132 may generate a classification result $L_{init}(j)$ among a foreground, a candidate, and a background by comparing a foreground probability value with respect to the $j^{th}$ pixel with preset threshold values $T_{low_t}$ and $T_{high}$ through Equation 12 below. When a pixel is classified into a candidate, the classification result $L_{init}(j)$ is used as an input for watershed segmentation such that the pixel is finally classified into the foreground or the background.

$$L_{init}(j) = \begin{cases} \text{Background} & \text{if } f_{FG}(j) \leq T_{low} \\ \text{Candidate} & \text{if } T_{low} \leq f_{FG}(j) < T_{high} \\ \text{Foreground} & \text{if } T_{high} \leq f_{FG}(j) \end{cases} \quad \text{Equation 12}$$

FIGS. 5A-5D are diagrams illustrating examples of detection a foreground from an input image.

Figure 5B:
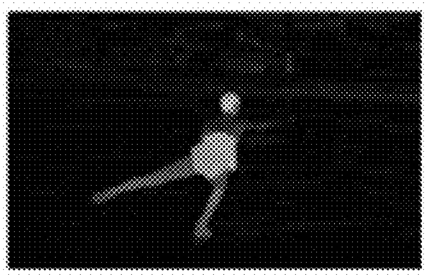
Figure 5C:
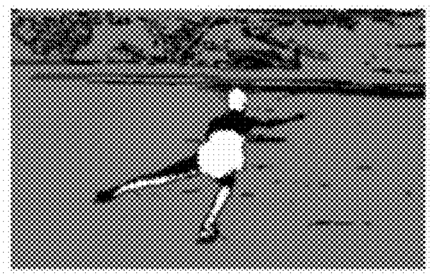
Figure 5D:
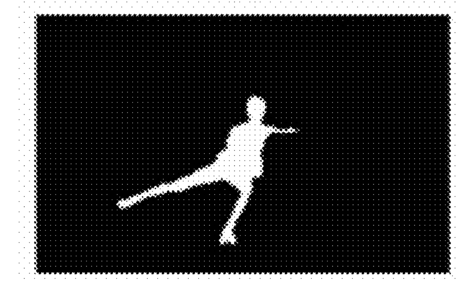

FIG. 5A represents an input current frame, FIG. 5B is a foreground probability map generated by the foreground probability map generator 131, and FIG. 5C is a result, which is classified by the foreground extractor 132 using the foreground probability map as a background, a foreground, and a candidate area. In FIG. 5D, a white area represents a foreground area, a black area represents the candidate area, and a gray area represents a background area. In an example, the candidate area may include a noise portion or a portion of the foreground area that has a foreground probability reduced due to its color being similar to the background. The candidate area is classified into the foreground area (the white area) and the background area (the black area) using the watershed segmentation method.

Figure 6:
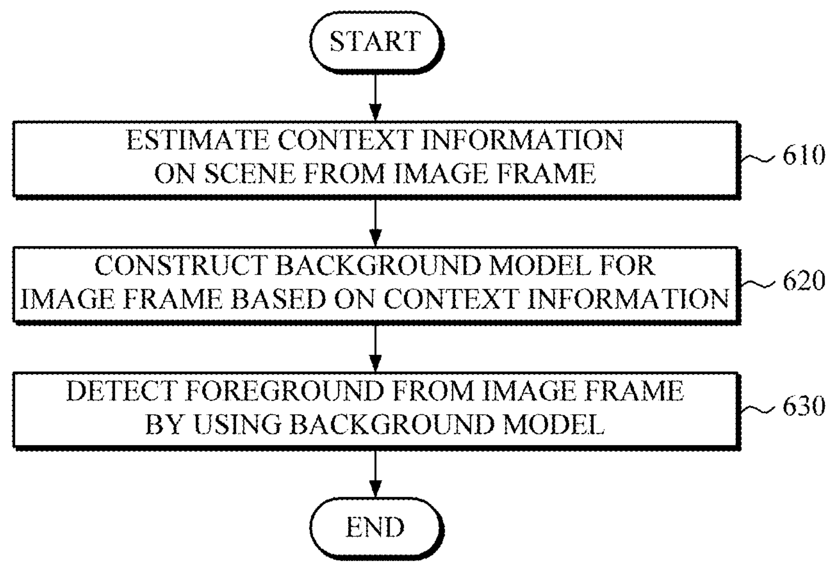
FIG. 6 is a illustrating an example of showing a method of detecting a foreground.

FIG. 6 is a diagram illustrating an example of a method of detecting a foreground. The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently.

The method of detecting a foreground according to an example described in FIG. 6 is performed by the foreground detecting apparatus 100. The method of detecting a foreground performed by the foreground detecting apparatus 100 should be understood as described with reference to FIGS. 1 to 5. In addition to the description of FIG. 6 below, the above descriptions of FIGS. 1-5, are also applicable to FIG. 6, and are incorporated herein by reference. Thus, the above description may not be repeated here.

Referring to FIG. 6, in 610, when a current frame of an image is input, the foreground detecting apparatus 100 may estimate context information representing a state of a scene of the current frame. In an example, the context information may include background motion, a foreground speed, and illumination change information, but the context information is not limited thereto. For example, the background motion may be obtained by obtaining motion information at each location in the current frame, removing an outlier, and representing the motion information as a projective transform matrix. In addition, the foreground detecting apparatus 100 may determine a location that does not match the background motion estimated at each location of the current frame as a foreground location using the projective transform matrix, and foreground detecting apparatus 100 may estimate a speed of the determined foreground location. A moving camera has a viewing area that may change significantly causing an abrupt change in overall brightness of an image. The illumination change may be used as information, which reflects a change in the brightness of the image.

In 620, the foreground detecting apparatus 100 may construct a background model for the current frame by reflecting the estimated context information, for example, the background motion, the foreground speed, and the illumination change information.

For example, since a background does not move in units of blocks, the background model constructor 120 may generate the background model for the current frame based on a background model of adjacent blocks or adjacent pixels of an immediately previous frame in consideration of the estimated background motion information. In an example, when a foreground speed is high, image matching may be determined to be poor due to edges, and in order to reduce a false alarm, an additional correction may be performed to increase a variance of the generated background model.

After the background model for the current frame is generated, the background model may be updated by reflecting the estimated illumination change. In an example, in order to prevent contamination of the background by a foreground, the background model may be updated differently according to the foreground speed. For example, when a value of a context variable defined based on the foreground speed is smaller than a block size, a mean is updated by reflecting the illumination change thereon, and the variance is not updated. In another example, when the value of the context variable is equal to or larger than the block size, the mean and the variance are updated by reflecting the illumination change and/or additional information.

In 630, after the background model for the current frame is constructed, a foreground may be detected from the current frame using the constructed background model. For example, a foreground probability map is generated using the background model, and using the foreground probability map, propagation is performed from a region having a high probability to nearby foreground candidate areas while the foreground is indicated. In an example, a lower limit and an upper limit of a threshold value are set, and a propagation probability value is compared with the lower limit and the upper limit of the threshold value so that a foreground area, a candidate area and a background area are classified, and the candidate area is subject to watershed segmentation so as to be classified into the background area or the foreground area.

Figure 7:
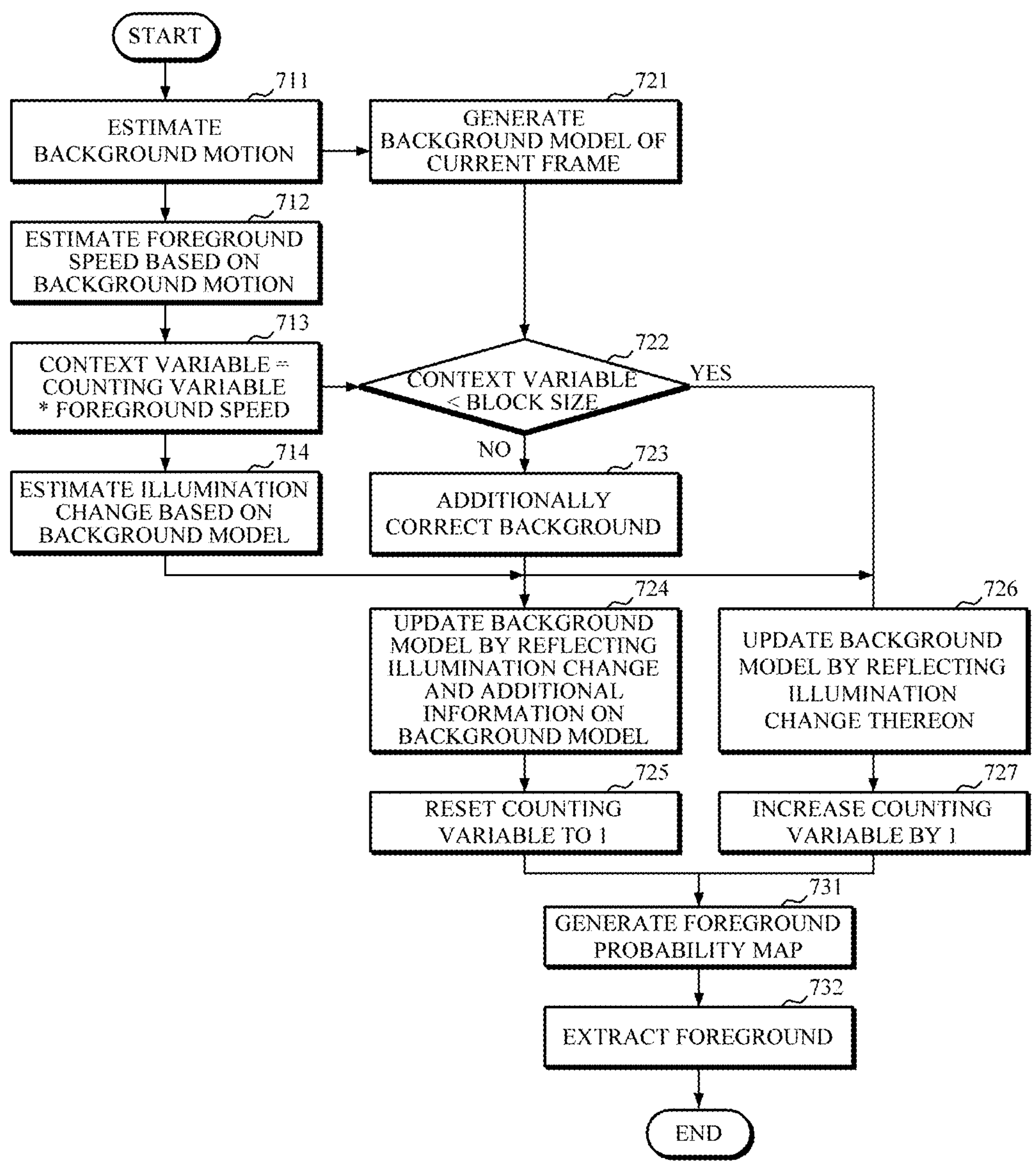
FIG. 7 is a diagram illustrating an example of a method of detecting a foreground.

FIG. 7 is a diagram illustrating an example of a method of detecting a foreground. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently.

The method of detecting a foreground according to an example described in FIG. 7 is performed by the foreground detecting apparatus 100. In addition to the description of FIG. 7 below, the above descriptions of FIGS. 1-6, are also applicable to FIG. 7, and are incorporated herein by reference. Thus, the above description may not be repeated here.

In 711, when a current frame is input from a camera, the foreground detecting apparatus 100 may estimate background motion by comparing the current frame with an immediately previous frame. Assuming that a background generally takes up a higher proportion than a foreground in an image, the foreground detecting apparatus 100 may obtain a speed at each location in units of blocks, remove an outlier, and generate a projective transform matrix that represents the background motion.

In 712, after the projective transform matrix representing the background motion is generated, a foreground speed may be estimated based on the projective transform matrix. For example, when the immediately previous frame is mapped to the current frame using the projective transform matrix, a location that does not properly satisfy the mapping is determined as a location of the foreground. By correcting each location calculated in the estimation of the background motion, the foreground speed is estimated. In an example, if a block speed is not precisely calculated in the estimation of the background motion, noise may exist. Accordingly, using only the foreground speeds of pixels in a foreground area of the immediately previous frame, the average foreground speed is estimated.

In 713, in order to reflect the foreground speed on the construction of a background model, a context variable may be set based on the foreground speed. For example, a counting variable is set to 1, and the counting variable is multiplied by the foreground speed to set a value of a context variable value.

In 714, an illumination change may be estimated based on the background model. In an example, using a difference between a mean of brightness intensities of a current frame and a mean of means of background models, the illumination change may be estimated.

In 721, after the projective transform model representing the background motion is generated, the foreground detecting apparatus 100 may generate a background model for the current frame using background motion information. For example, a certain location of the current frame is mapped to an immediately previous frame using the projective transform model, integer locations around the mapped location of the immediately previous frame are determined using bilinear interpolation, and background models of the determined plurality of locations are subject to weighted summation, thereby generating a background model. The background model that is generated is subject to an update process to be constructed as a background model of the current frame.

In 722, the foreground detecting apparatus 100 may compare the context variable set in operation 713 with a block size in order to differently update the background model in consideration of the foreground speed.

In 723, when it is determined as a result of the comparison of operation 722 that the context variable is equal to or larger than the block size, the variance of the background model generated in operation 721 is additionally corrected. In an example, squares of differences between a mean of the generated background model and means of the background models of the respective locations are subject to weighted summation. The result of the weighted summation is added to a variance of the background model so that the probability of a foreground is calculated at a lower probability in foreground extraction, thereby reducing a false alarm.

In 724, the background model may be updated by reflecting illumination change and additional information on the background model. For example, as shown in Equation 8, the mean of the background model corrected in operation 723 may be updated by reflecting an illumination change and additional information, which is a value defined as a block brightness intensity average, thereon, and the variance of the background model may be updated by reflecting additional information, which is a maximum value of a square of a difference between the mean of the background model and an input image, thereon. In an example, by reflecting a time-variant variable calculated by Equation 10 on the update of the mean and the variance, an update intensity may be adjusted. As such, a block that has appeared for the first time on the scene is updated at a high speed, and a block that has appeared for a long time is updated at a low speed.

In 725, the counting variable is reset to 1 for the next frame.

In 726, when it is determined as a result of the comparison of operation 722 that the context variable is smaller than the block size, the background model may be updated by reflecting the illumination change thereon the additional correction of the generated background model. In an example, as shown in Equation 8, the mean of the background model generated in operation 721 is updated by adding the illumination change to the mean, and the variance of the background model is maintained.

In 727, the counting variable is increased by 1 for the next frame. The increase of the counting variable prevents the background model from not being updated for a long time when the foreground speed is always slow compared to the block size.

In 731, the foreground detecting apparatus 100 may generate a foreground probability map representing a probability that each pixel corresponds to the foreground using the updated background model.

In 732, the foreground detecting apparatus 100 may extract the foreground from the current frame using the generated foreground probability map. For example, a lower limit and an upper limit of a probability threshold are set, and the foreground probability of each pixel is compared with the lower limit and the upper limit so that each pixel is classified into one of the foreground, a candidate, and the background. The pixel classified into the candidate is subject to watershed segmentation to be classified into one of a background area or a foreground area.

FIGS. 8A-8E are diagrams illustrating detection of a foreground through recognition of a foreground speed.

Figure 8A:
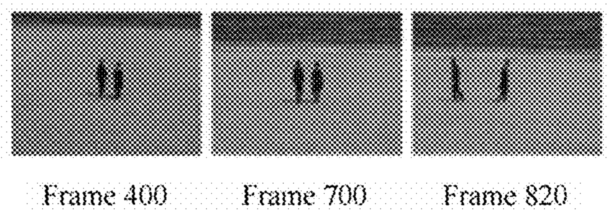
Figure 8B:
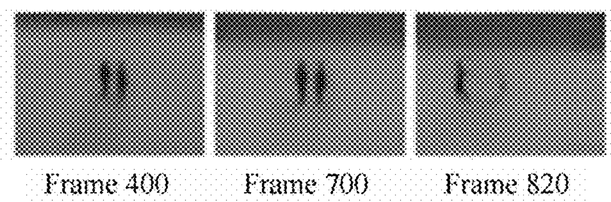
Figure 8C:
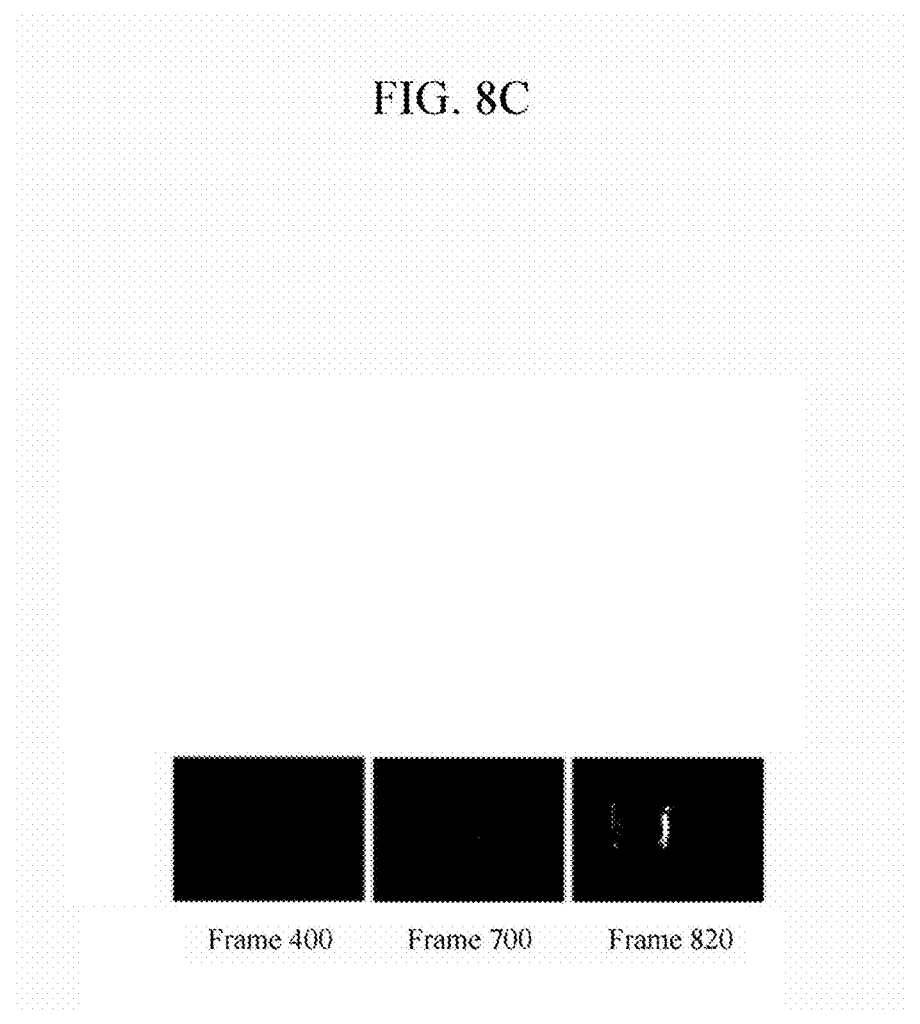
Figure 8D:
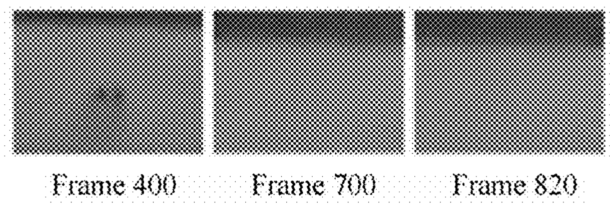
Figure 8E:
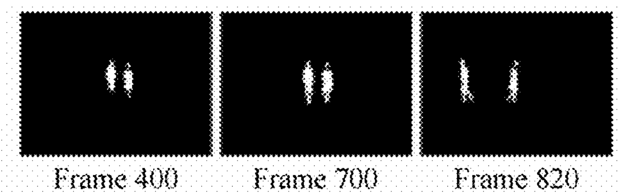

FIG. 8A represents an input image in which a foreground speed is slow, FIGS. 8B AND 8C represent a background and a foreground extracted using a general foreground detecting method, respectively. It can be seen a background model has a foreground introduced thereto in FIG. 8B so that the foreground is not properly detected in FIG. 8C even if the background is relatively simple. In contrast, FIGS. 8D and 8E represent results detected using the above-described examples, in which the background is not contaminated by the foreground in FIG. 8D so that the foreground is precisely detected in FIG. 8E.

FIGS. 9A-9E are a diagram illustrating detection of a foreground through recognition of an illumination change.

Figure 9A:
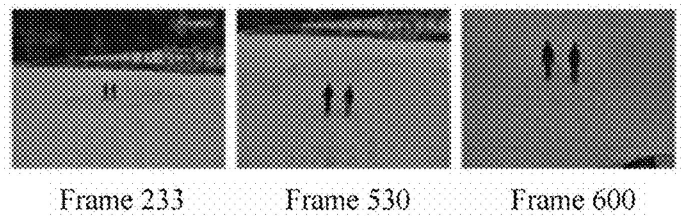
Figure 9B:
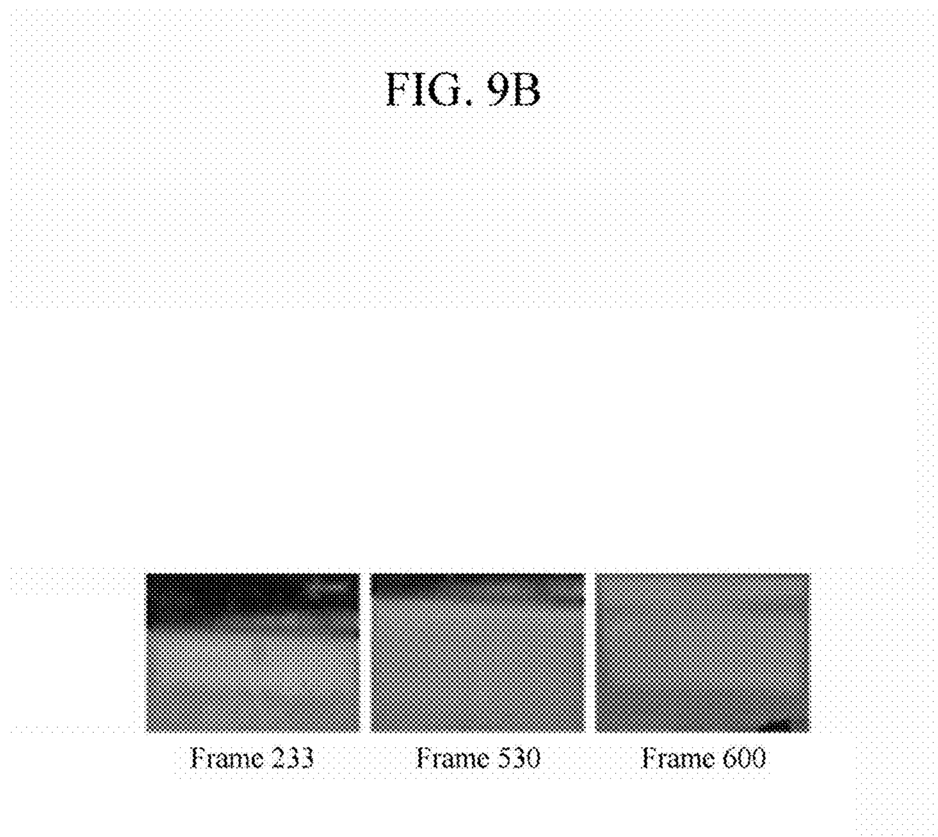
Figure 9C:
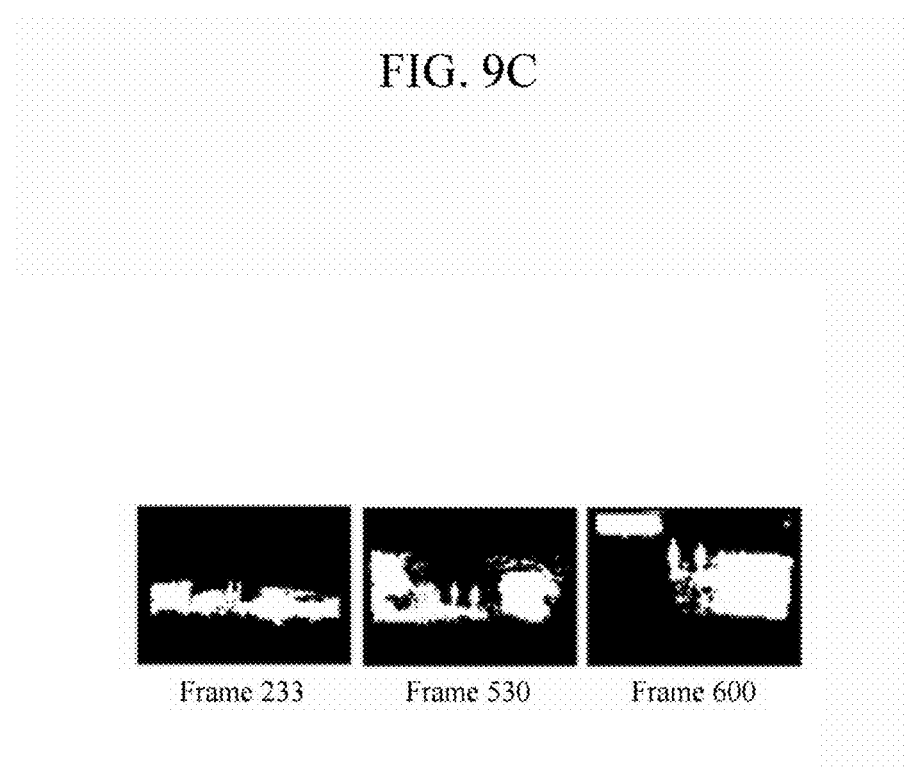
Figure 9D:
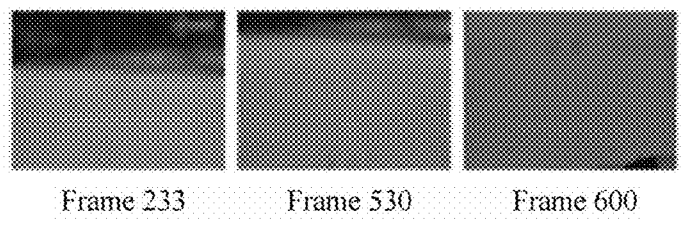
Figure 9E:
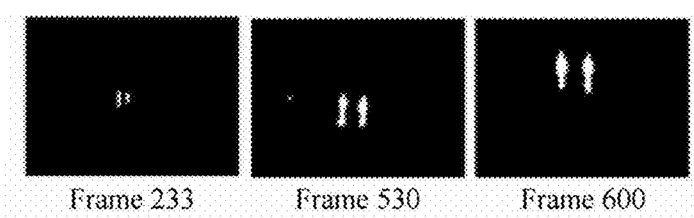

FIG. 9A represents an input image in which a brightness of a scene is greatly changed by an auto-exposure control function when a camera moves abruptly in up and down directions. FIGS. 9B and 9 represent a background and a foreground detected without the illumination change reflected thereon. FIGS. 9D and 9E represent a background and a foreground detected with the illumination change reflected thereon. In the case when the brightness of a scene of an input image is greatly changed, ignorance of the illumination change may cause a boundary of the brightened area on the scene to be indicated as shown in the background image of FIG. 9B, thereby causing the background image to be broken. In contrast, when the illumination change information is reflected in accordance with the examples described above, an overall brightness change of the background is corrected as in FIG. 9D, so that a smooth background model is constructed. Thereby, obtaining a foreground area robust to an illumination change as in FIG. 9E.

In an example, the foreground detecting apparatus 100 may be embedded in or interoperate with a camera. In an example, the camera may be embedded in or interoperate with various digital devices such as, for example, a mobile phone, a cellular phone, a smart phone, a wearable smart device (such as, for example, a ring, a watch, a pair of glasses, glasses-type device, a bracelet, an ankle bracket, a belt, a necklace, an earring, a headband, a helmet, a device embedded in the cloths), a personal computer (PC), a laptop, a notebook, a subnotebook, a netbook, or an ultra-mobile PC (UMPC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device or portable navigation device (PND), a handheld game console, an e-book, and devices such as a high definition television (HDTV), an optical disc player, a DVD player, a Blue-ray player, a setup box, robot cleaners, a home appliance, content players, communication systems, image processing systems, graphics processing systems, other consumer electronics/information technology (CE/IT) device, or any other device capable of wireless communication or network communication consistent with that disclosed herein. The digital devices may be implemented in a smart appliance, an electric vehicle, an intelligent vehicle, or in a smart home system.

The digital devices may also be implemented as a wearable device, which is worn on a body of a user. In one example, a wearable device may be self-mountable on the body of the user, such as, for example, a watch, a bracelet, or as an eye glass display (EGD), which includes one-eyed glass or two-eyed glasses. In another non-exhaustive example, the wearable device may be mounted on the body of the user through an attaching device, such as, for example, attaching a smart phone or a tablet to the arm of a user using an armband, incorporating the wearable device in a cloth of the user, or hanging the wearable device around the neck of a user using a lanyard.

The foreground detecting apparatus 100, context information estimator 110, background model constructor 120, foreground detector 130, background motion estimator 111, foreground speed estimator 112, illumination change estimator 113, background model generator 121, background model updater 122, foreground probability map generator 131, and foreground extractor 132 described in FIGS. 1 and 2A-2C that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 6 and 7 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus for detecting a foreground in an image, the apparatus comprising:

a memory configured to store instructions; and a processor configured to execute the instructions to:

estimate context information, including a foreground speed, on a scene from an image frame of the image;

construct a background model of the image frame using the estimated context information; and detect a foreground from the image frame based on the constructed background model, wherein the foreground speed is estimated by calculating a speed using an optical flow of the image frame and a previous image frame, and correcting the speed based on a projective transform matrix that represents background motion.

2. The apparatus of claim 1, wherein the context information further includes an illumination change.

3. The apparatus of claim 2, wherein the processor is further configured to execute the instructions to:

generate the projective transform matrix using the speed; and estimate the illumination change based on a difference between a mean of brightness intensities of the image frame and a mean of brightness intensities of the background model.

4. The apparatus of claim 3, wherein the previous image frame comprises an immediately previous image frame.

5. The apparatus of claim 2, wherein for the construction of the background model, the processor is further configured to execute the instructions to generate the background model of the image frame using a background model of the previous image frame and the background motion.

6. The apparatus of claim 5, wherein for the construction of the background model, the processor is further configured to execute the instructions to determine locations on the previous image frame based on a location of the previous image frame which corresponds to a first location of the image frame, and to generate a background model of the image frame for the first location by performing weighted summation on background models of the previous image frame for the determined locations.

7. The apparatus of claim 6, wherein for the construction of the background model, the processor is further configured to execute the instructions to correct a variance of the generated background model, in response to a value of a context variable based on the foreground speed being greater than or equal to a block size.

8. The apparatus of claim 7, wherein for the construction of the background model, the processor is further configured to execute the instructions to correct a variance of the background model of the first location by reflecting differences between a mean of the background model of the first location and means of the background models at the determined locations.

9. The apparatus of claim 5, wherein for the construction of the background model, the processor is further configured to execute the instructions to update the generated background model based on the illumination change.

10. The apparatus of claim 9, wherein for the updating of the generated background model, the processor is further configured to execute the instructions to update a mean of the generated background model by reflecting the illumination change, in response to value of a context variable being smaller than a block size, and to update the mean and a variance of the generated background model by reflecting the illumination change and additional information, in response to the value of the context variable being greater than or equal to the block size.

11. The apparatus of claim 10, wherein the additional information comprises either one or both of a mean of block-specific brightness intensities and information on a difference between a mean of the generated background model and the image frame.

12. The apparatus of claim 10, wherein for the updating of the generated background model, the processor is further configured to execute the instructions to calculate a value of a time-variant variable in units of blocks starting from an initial image frame input from the camera to the image frame, and to adjust an update intensity of the generated background model using the value of the time-variant variable.

13. The apparatus of claim 1, wherein for the updating of the generated background model, the processor is further configured to execute the instructions to generate a foreground probability map by calculating a foreground probability for each pixel of the image frame based on the constructed background model, and extract the foreground from the image frame using the generated foreground probability map.

14. The apparatus of claim 13, wherein for the extracting of the foreground, the processor is further configured to execute the instructions to classify each pixel of the image frame into any one or any combination of any two or more of the foreground, a candidate, and a background based on a comparison of the foreground probability of each pixel of the image frame with a threshold value, and to categorize pixels classified into the candidate into the foreground or the background based on applying watershed segmentation to the pixels classified into the candidate.

15. A method of detecting a foreground in an image, the method comprising:

estimating context information, including a foreground speed, on a scene from an image frame of the image;

constructing a background model of the image frame using the estimated context information;

correcting a variance of the constructed background model, dependent on whether a value of a context variable based on the foreground speed is greater than or equal to a block size; and detecting a foreground from the image frame based on the variance-corrected constructed background model.

16. The method of claim 15, wherein the context information further comprises an illumination change.

17. The method of claim 16, wherein the constructing of the background model comprises generating the background model of the image frame using a background model of a previous image frame based on information on a background motion.

18. The method of claim 17, wherein the constructing of the background model further comprises updating the constructed background model based on the illumination change.

19. The method of claim 18, wherein the updating of the background model further comprises, updating a mean of the constructed background model by reflecting the illumination change, in response to a value of the context variable being smaller than a block size, and updating a mean and the variance of the constructed background model by reflecting the illumination change and additional information, in response to the value of the context variable being greater than or equal to the block size.

20. The method of claim 15, wherein the detecting of the foreground comprises generating a foreground probability map by calculating a foreground probability for each pixel of the image frame based on the constructed background model, and extracting the foreground from the image frame using the generated foreground probability map.

21. A non-transitory computer-readable storage medium storing instructions that, when executed by a processor, cause the processor to perform the method of claim 15.

22. A digital device, comprising:

an antenna;

a cellular radio configured to transmit and receive data via the antenna according to a cellular communications standard;

a touch-sensitive display;

a camera configured to capture an image;

a memory configured to store instructions; and a processor configured to execute the instructions to receive the image from the camera, estimate context information, including an illumination change, on a scene from an image frame of the image, construct a background model of the image frame using the estimated context information, update a mean of the constructed background model by reflecting the illumination change, dependent on whether a value of a context variable is smaller than a block size, and detect a foreground from the image frame based on the constructed background model.

* * * * *